D. B. Dixon,
Feed Trough.
No. 106,562.  Patented Aug. 23, 1870.
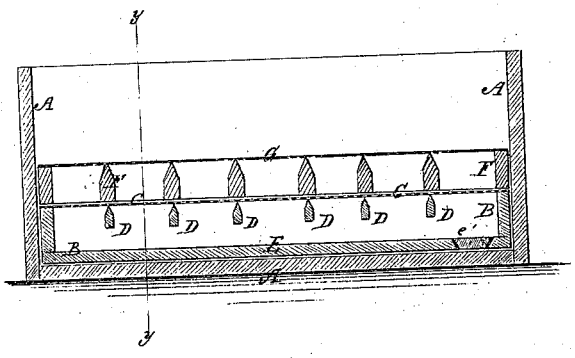
Witnesses:
Chas. Nida.
L. S. Mabee
Inventor:
D. B. Dixon
Per Munn & Co
Attorneys.

UNITED STATES PATENT OFFICE.

DAVID B. DIXON, OF UNIONVILLE, MISSOURI.

IMPROVEMENT IN GRASS-SEED SEPARATORS FOR MANGERS.

Specification forming part of Letters Patent No. 106,562, dated August 23, 1870.

*To all whom it may concern:*

Be it known that I, DAVID B. DIXON, of Unionville, in the county of Putnam and State of Missouri, have invented a new and useful Improvement in Grass-Seed Separator; and I do hereby declare that the following is a full, clear, and exact description thereof, which will enable others skilled in the art to make and use the same, reference being had to the accompanying drawing, forming part of this specification.

Figure 1 is a longitudinal section of a manger with my improved seed-separator attached, taken through the line $x\ x$, Fig. 2. Fig. 2 is a cross-section of the same, taken through the line $y\ y$, Fig. 1.

Similar letters of reference indicate corresponding parts.

My invention has for its object to furnish an improved device for separating and preserving the seed of timothy or Hungarian grass when being fed to horses or other stock; and it consists in a box or frame provided with cross-slats and covered with wire-cloth, as hereinafter more fully described.

A represents an ordinary manger. B is a frame, to the upper edges of which is attached a wire-cloth, C. D are cross-slats crossing the upper part of the frame B, and the ends of which are secured to the side bars of said frame B. The upper edges of the slats D are beveled off to or nearly to an edge, so that they may not obstruct the passage of the seed through the wire-cloth C, and may yet prevent said wire-cloth from being pressed down or sagging in the middle. The frame B may be provided with a bottom, E, to retain the seed within the frame B, and in this case the said bottom should have a sliding door, $e'$, to enable the seed to be conveniently removed when required.

I also provide a second sieve-frame, F, which is constructed similar to the frame B, except that it is unprovided with a bottom.

The wire-cloth G of the same is, however, coarser, or so woven as to have larger interstices between the wires than the cloth C, and is thus adapted to allow correspondingly coarser or heavier seeds to pass through it. These seeds, being too large to pass through the cloth C, rest thereon, and thus two varieties or grades of seed may be separated at the same time.

The bottom of the box or manger in which the device is placed may be made inclined, so as to guide the seed to the barn-floor, or into some receptacle prepared to receive it.

The device may be placed in a manger, or in a box or hopper placed near the mow or stack, and provided with a rack, upon which the hay may be thrown and shaken up to cause the ripest seeds to fall out, which said seeds are caught and preserved. This device enables the farmer or other stock-feeder to secure and preserve the ripest seeds, and removes the necessity of leaving a patch of grass to be cut and thrashed to obtain the seed.

Having thus described my invention, I claim as new and desire to secure by Letters Patent—

The combination of the frame B, wire-cloth covering C, and beveled cross-slats D with each other, said parts being constructed and arranged substantially as herein shown and described, to adapt the device for use in a manger, box, or hopper, for receiving and preserving the grass-seed, as set forth.

DAVID B. DIXON.

Witnesses:
ABRAHAM SECHRIST,
ALLEN COOK.